United States Patent Office 3,423,227
Patented Jan. 21, 1969

3,423,227
ORGANOPHOSPHORUS POLYMER PROTECTIVE COATING
Clayton E. Hathaway, Jr., Dayton, Ohio, assignor to Monsanto Research Corporation, St. Louis, Mo., a corporation of Delaware
No Drawing. Filed Sept. 27, 1965, Ser. No. 490,653
U.S. Cl. 117—132                                14 Claims
Int. Cl. B32b 15/08

This invention relates to coated materials which are serviceable at elevated temperatures and more particularly provides a new and valuable heat-resistant protective coating and the method of preparing the same.

In the manufacture of modern aircraft there is need for tough, smooth finishes having extraordinary heat stability and tenacious adherence to smooth surfaces such as those presented by metal sheetings and glass. Generally, coatings having an organic polymer base do not possess the desired thermal properties, even when there are employed such expedients as hardening in the presence of cross-linking agents and/or introducing an inorganic moiety into the polymer structure. Moreover, the organic-based coatings often does not adhere well to smooth, continuous substrates. Although ceramic coatings are often employed on metals which require protection against oxidation at high temperatures, the preparation of such coatings requires firing temperatures which are generally much higher than those to which the coated article will need to be subjected during use.

An object of this invention is to provide a stable, fluid coating composition which can be applied to smooth surfaces to form a film of substantial thickness which adheres tenaciously to the substrate, withstands elevated temperatures, and presents a tough, hard surface of pleasing appearance. Another object is the provision of thermally stable protective coatings for metals. Still another object is the provision of a liquid coating composition which dries and adheres to the substrate at comparatively low temperatures and which can be converted to a tough, tenacious, thermally resistant coating by subsequent heating.

These and other objects hereinafter defined are provided by the process which comprises substantially uniformly applying to the surface of a substrate a fluid composition consisting essentially of a mixture of a normally solid organophosphorus polymer consisting essentially of the repeating units

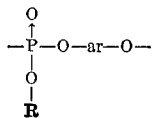

in which R and ar are aromatic hydrocarbyl radicals free of olefinic and acetylenic unsaturation and containing from 6 to 16 carbon atoms, an inert, organic, liquid diluent for said polymer, and finely comminuted titanium dioxide in a quantity which is from 100% to 400% by weight of the polymer, evaporating off said diluent from said composition, and curing the composition remaining in an inert atmosphere at above 200° C. and below 550° C. to decrease the weight of the remaining composition by from 10 to 25% in order to obtain upon the substrate a strongly adherent in situ formed coating.

More particularly, the invention provides the process of curing a coating deposited upon a heavy metal substrate and consisting essentially of titanium dioxide and the said polymer in a weight ratio of from 1:1 to 4:1 which comprises heating the substrate with the coating deposited thereon in an inert atmosphere at 300° to 550° C. until the weight of the coating has been reduced by from 10 to 25 percent. When R in the above formula is phenyl and ar is phenylene, a titanium dioxide/polymer ratio of from 1.1:1.0 to 2.5:1.0 is preferred.

The presently useful organophosphorus polymers are normally solid, linear polyphosphates which are well known to the art. They may be readily prepared by reaction of an aryl phosphorochloridate with a dihydroxy aromatic hydrocarbon as disclosed in the Cass U.S. Patent No. 2,616,873, in the article by Korshak which appears in the Journal of Polymer Science, 31, 319–326 (1958) and in Vysokomolekulyarnye Soedineniya, 1, 825–7 (1959), and in the article by H. Zentfman et al. which appears in British Plastics, 25, 374 (1952). Hydrogen chloride is the by-product in this reaction. Another method of preparing the linear polyphosphates forms the subject matter of the copending application of M. L. Nielsen, Ser. No. 421,073, filed Dec. 24, 1964, wherein an aromatic hydrocarbon diimidazol-1-ylphosphinate is reacted with a dihydroxy aromatic compound. Imidazole is the by-product in this reaction.

The two methods give the same polymer, thus:

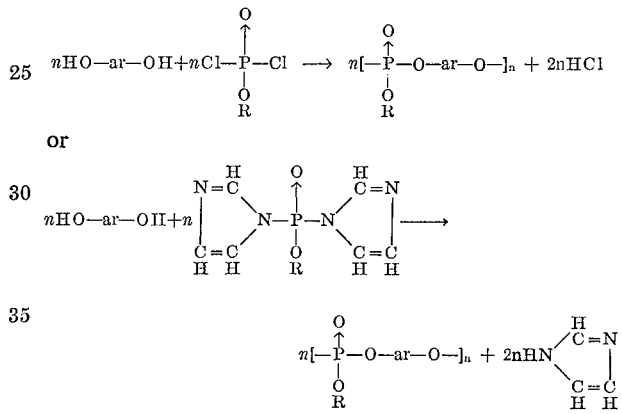

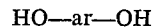

Imidazole is readily is separated from the polymer; whereas, hydrogen chloride is not. Moreover, imidazole does not present the corrosive problems that are encountered when hydrogen chloride is dealt with. Hence, the latter process is preferred. However, irrespective of the method of preparation, the normally solid, linear organic polyphosphates which consist essentially of the above depicted repeating unit are useful for the present purposes. The dihydroxy aromatic hydrocarbon, HO—ar—OH may have as many as 15 carbon atoms in the molecule, and the hydroxy groups may or may not be present at the nuclear carbon, e.g., there may be used aromatic diols such as hydroquinone, pyrogallol, resorcinol, o-, m- or p-biphenol, 4,4'-isopropylidenediphenol, 2,2'-methylene-dicresol, o-, m- or p-hexylresorcinol and 1,2-, 1,4- or 1,8-naphthalenediol; or there may be used bis(hydroxyalkyl)benzenes such as o-, m- or p-xylene-α,α'-diol or 2,2'-biphenyldiethanol. The dihydroxy benzenes are preferred; in polymers obtained therefrom the term ar of the above polymer units is linked through nuclear carbon to the oxygen atoms.

In the ester group —OR of the phosphorodichloridate or of the diimidazol-1-ylphosphinate, R is likewise a benzenoid hydrocarbon radical which may or may not be linked to oxygen through nuclear hydrocarbon; i.e., there may be used phenyl, o-, m- or p-tolyl, mesityl, dibutylphenyl, α- or β-naphthyl, o-, m- or p-biphenylyl, o-, m- or p-nonylphenyl, benyl, or 2-phenylethyl phosphorodichloridate or diimiadazol-1-ylphosphinate. However, R is preferably linked to the oxygen through nuclear carbon.

In preparing the linear organic polyphosphates by either process, the hydrocarbon moieties ar and R are not affected; hence, they appear intact in the polymer units obtained from the dihydroxy compound and either the phosphorodichloridate or the diimidazol-1-ylphosphinate.

The linear organic polyphosphates are generally hard, brittle resins which are insoluble in water, alcohols and aliphatic hydrocarbons and soluble with heating if necessary, in chloroform, ethylene dichloride, benzene/alcohol, toluene/butanol, imidazole and quinoline. Solutions of the polymers may be used as coatings for metal surfaces to give adherent films. However, upon long exposure to high temperatures, i.e., temperatures in the range of 400–500° C., they undergo considerable decomposition. The film continues to adhere, but it decreases in weight and hence in thickness to the point where it no longer possesses protective effect.

According to the invention, it has been found that the usefulness of the linear, organic polyphosphates for the manufacture of thermally resistant coatings can be significantly increased by incorporating into a solution of the polymer a quantity of titanium dioxide which is from 100–400% of the weight of the polymer, applying the resulting composition to the substrate to be coated, evaporating off the solvent to give a coating of the dried composition upon the substrate surface and then submitting the dried composition to a curing step. This is conducted by gradually heating the coated substrate in an inert atmosphere. During the curing step, the weight and thickness of the coating gradually decreases owing to change in the polymer. The ratio of organic material to inorganic becomes lower as heating progresses and the remaining organic material becomes firmly bonded to the titanium dioxide and to the substrate in such a manner that subsequent heating under the same conditions has very little, if any effect. Although the mechanism through which this conversion is brought about is not known, it is believed that the ester group —OR of the polymer is cleaved with liberation of the hydrocarbon R group. Cross-linking may explain the firm retention of titanium oxide in the final coating and the fact that little, if any, weight loss is noticed when the cured compositions are reheated. Accordingly, in the case of the phosphate-titanium dioxide coatings, there is obtained, during the curing step, an in situ formed coating of high thermal stability.

The coating is unique because, owing to the curing weight loss, it contains a very high ratio of titanium dioxide to organic material. For example, when a fluid composition consisting essentially of a 1:1 weight ratio to titanium dioxide to the organo phosphate polymer, plus solvent for the polymer, is applied to a metal substrate, dried to remove the solvent, and then cured on the substrate at up to about 500° C., the coating on the substrate weighs about 20% less than it did after drying. The 20% loss in total weight represents a 40% loss in the weight of the polymer. Therefore, the cured coating has about a 63:37 weight ratio of titanium dioxide to polymer. As the ratio of titanium dioxide to polymer in the fluid composition is increased, the 40% loss of the polymer remains substantially constant; but since less of the polymer is initially present, percent loss of the total composition is less. Thus, with an initial 60:40 titanium dioxide-polymer composition, a curing loss of 16 percent by weight in the total solvent-free composition represents about a 40% loss in polymer; hence, in this case, the cured coating has about a 72:28 weight ratio of titanium dioxide to organic material. Similarly, starting with a 80:20 weight ratio titanium dioxide-polymer composition, curing under the same conditions will give a coating having about an 88:12 weight ratio of titanium dioxide to polymer. The percent loss in the weight of the original polymer will depend, of course, upon the nature of the polymer and upon the curing conditions. When the hydrocarbon R of the ester group —OR is phenyl, the percent loss in total weight will obviously be less than when R is biphenylyl. Generally, curing above 200° C. and below 550° C. to give a cured coating which weighs from about 10% to 25% less than does the uncured coating results in a tough, tenaciously adherent, continuous film which withstands further heating under the same conditions without substantial weight loss. Although the weight of the residual polymer in the cured coating is significantly lower than the weight of the polymer in the uncured coating, the polymer residue is apparently sufficient not only for binding together the titanium dioxide particles, but also for bonding the coating to the substrate. The film of cured coating is sufficiently thick and dense to provide excellent protection to the substrate surface. For example, curing of a 0.4 mil film prepared from a composition containing a polymeric organophosphate, where R of the ester group —OR is phenyl and ar is phenylene, and slightly more than an equal weight of titanium dioxide, based on the polymer, reduces the thickness of the film to about 0.3 mil. No significant change in the film thickness is evidenced when the cured coating is later submitted to the conditions of curing.

Accordingly, the present coating method and the coated substrate provided thereby are eminently suited for space applications wherein long exposure to high temperatures in an inert atmosphere is encountered. The essentially inorganic, tightly bonded coating is tough and smooth and remains so in spite of such exposure. The present process also provides for substantial retention of the organo phosphate derived coating during exposure to air at high temperatures. Thus, although exposure of a coating obtained from the same polymer in absence of titanium oxide and subjected to the same curing conditions will decrease in weight by about 73% when aged in air at about 427° C. for eight hours, a coating prepared in the same way from the present titanium dioxide-containing compositions undergoes a weight decrease of only about 25% under the same conditions. This comparatively low loss upon exposure to air at the high temperatures assures protective effect even through the contemplated application in space requires some exposure to air at such temperatures.

Formulation of the presently provided fluid compositions is conducted, e.g., by milling the desired quantity of finely comminuted titanium dioxide, e.g., a pigment grade material, with a solution of the polymeric organo phosphate to give a fluid mass containing particles of the titanium dioxide substantially uniformly suspended therein. The solvent may be any inert, organic liquid which dissolves the polymer at ordinary room temperature or upon heating. Although the low boiling solvents, e.g., chloroform or ethylene dichloride dissolve the polymer, the less readily voltalizable liquids are preferred owing to ease of storage and in order to avoid rapid evaporation on application. When the polymer has been prepared from the diimidazol-1-ylphosphinate, whereby imidazole is a by-product, the use of imidazole as the solvent is convenient in that separation of the polymer from the by-product may be eliminated. The crude reaction mixture consisting of the polymer and the by-product imidazole is simply applied directly to the substrate. However, since the imidazole is present as a by-product in an amount which is insufficient to provide for the desired fluidity, an extraneous solvent is generally used with the imidazole. Quinoline is useful for this purpose because it is miscible with the imidazole and permits thorough solution of the polymer at a temperature which is lower than that required with imidazole alone. However, except for convenience, the nature of the solvent is immaterial.

Drying of the fluid composition upon the substrate may be done with or without heating, depending upon the ease of volatilization of the solvent. In experimental runs, in order to avoid possible degradation and/or untimely curing, drying of the applied composition is conveniently conducted in the dry box. Generally, however, air-drying to set may be employed, particularly when evaporation of the solvent requires little, if any, application of heat.

Because the curing step involves the use of temperatures at which oxidative attack may be expected, curing is conducted in an inert atmosphere which may be, e.g., nitrogen, argon, carbon dioxide, vacuum, etc. Advantageously the substrate, with the dried coating deposited thereon, is subjected, during a period of, say, from about one to five or six hours, to gradually increasing temperatures until a maximum of about 450° C. to 550° C. has been attained and heating is continued at the maximum temperature for a time of about a few minutes to an hour in order to assure completion of curing. This point can be readily ascertained in experimental runs by noting substantial cessation of change in the film. A well cured film will generally be smooth, dull rather than glossy, dark gray in color, adherent to the substrate and hard enough to resist scratching with a soft pencil. Upon continued heating at the maximum curing temperature in an inert atmosphere, say, an additional hour, there results substantially no detectable weight loss; however, prolonged heating under such conditions may result, in as much as a 2 to 3% decrease in coating weight over a period of, say, from about 8 to 12 hours. A change of this magnitude occurs within, say, a 30 minute interval during curing.

Evaluation of the cured coating may be conducted at the temperature and in the atmosphere which are to be encountered in the contemplated use of the cured, coated substrate. It is then inspected to determine the effect, if any, on adherence of the coating, its color, thickness and mechanical strength. Generally, aging in air will convert the dark gray, cured film to a slightly thinner one of a substantially off-white color; however, the continuity, adherence and hardness of the film are substantially unchanged.

The invention is further illustrated by, but not limited to the following example.

EXAMPLE

A polymeric phosphorus ester was prepared as follows:

A mixture consisting of 5.23 g. (0.0191 mole) of phenyl diimidazol-1-ylphosphinate, 2.18 g. (0.0198 mole) of resorcinol and 10 ml. of quinoline was heated with stirring under nitrogen to 195° C. in 45 minutes. The reaction vessel was then evacuated, and a mixture of quinoline and imidazole distilled out. The temperature of the vessel and contents was maintained at 200° C. for 30 minutes until no more imidazole appeared. The remaining product was cooled and removed from the vessel as a hard solid consisting of the repeating unit

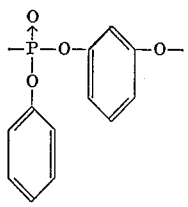

The above polymer was used in each of the following two formulations:

(I)

| | Parts by weight |
|---|---|
| Polymer | 0.50 |
| Imidazole | 0.50 |
| Quinoline | 1.75 |

(II)

| | |
|---|---|
| Polymer | 0.50 |
| Imidazole | 0.50 |
| Quinoline | 1.75 |
| Titanium dioxide | 0.70 |

For each formulation a solution of the polymer was prepared by mixing the polymer with the imidazole and quinoline and heating. For formulation (II), the titanium dioxide was added to the solution and the whole was mixed in the ball mill for about 30 minutes. Equal amounts of each formulation were respectively applied, to give substantially uniform coatings, to aluminum and stainless steel surfaces. Two panels of aluminum and 2 panels of stainless steel were used with each formulation. The coated panels were placed on the hot plate in the dry box to dry, and the dried panels were weighed. They were then cured by heating them at each of the following temperatures: 100, 250, 350, 400, 450 and 500° C., employing successive heating periods of 30 minutes at each temperature. Each of the panels was weighed to determine the weight loss in the coating which resulted from the curing. The following results were obtained:

| | Loss in weight, percent |
|---|---|
| Al with (I), panel 1 | 44 |
| Al with (I), panel 2 | 43 |
| Stainless steel with (I), panel 3 | 41 |
| Stainless steel with (I), panel 4 | 41 |
| Al with (II), panel 5 | 16 |
| Al with (II), panel 6 | 16 |
| Stainless steel with (II), panel 7 | 16 |
| Stainless steel with (II), panel 8 | 20 |

The cured coatings were then tested for thermal stability by maintaining panels 1, 3, 5 and 7 with the cured coatings deposited thereon, in an atmosphere of air at 800° F. for 8 hours. They were then weighed. Based on the weight of the cured coatings before the 8-hour heat test, the following losses in weight were determined.

| | Loss in weight, percent |
|---|---|
| Al with (I), panel 1 | 73 |
| Stainless steel with (I), panel 3 | 55 |
| Al with (II), panel 5 | 25 |
| Stainless steel with (II), panel 7 | 22 |

The above data show that curing of the titanium dioxide-containing composition (II) resulted in less than half the loss in weight which occurred with like curing of the titanium dioxide-free composition (I) and that upon exposure to air the cured coatings obtained with the titanium dioxide-containing composition (II) weighed at least twice as much as those obtained from the titanium dioxide-free composition (I). In the case of the aluminum panel 1, wherein the curing loss with (I) was 44%, only 56% of the solids content of the originally applied composition remained before the thermal stability test. The latter test resulted in a 73% loss of this remainder, hence at the end of the test only about 15% of the originally applied solids remained as the coating. On the other hand, curing of the coating of composition (II) on the aluminum panel 5, which resulted in a curing loss of only 16%, gave a cured coating which contained 84% of the original solids. Heating this remaining coating in air resulted in a 25% weight loss, and thus gave a coating which contained 63% of the originally employed solids. Note that this value is higher than the solids content obtained with the titanium-dioxide free composition (I) upon curing and before heating in air.

For space applications, of course, the behavior of a coating at very high temperatures in air is not controlling. Accordingly, those of the test panels which have been coated with the titanium dioxide-containing composition (II) and cured as described above, but which had not been subjected to the heating in air test, were tested for behavior in an inert atmosphere by maintaining them in argon for 8 hours at 1000° F. Based on the weight of the cured coatings, the following weight losses were determined to result from this test.

| | Loss in weight, percent |
|---|---|
| Al with (II), panel 6 | 2 |
| Stainless steel with (II), panel 8 | 1 |

In view of the above data, cured coatings prepared from the titanium dioxide-containing composition are eminently suited for coating metal surfaces which are destined to be exposed to very high temperatures in space. The 16–20% weight loss in solids which accompanies the curing gives a coating containing from 80 to 84% of the solids content of the originally applied composition, and this solids content persists with only from a 1–2% loss in spite of continued exposure to extreme heat. Moreover, the cured coatings, before and after exposure to the high temperatures, either in air or argon, are hard and tenaciously bonded to the substrate. Owing to the low loss in weight, there is very little, if any, variation in the thickness of the coating film as a result of the exposure tests. Thus, whereas coatings of the two cured strips of stainless steel each had a thickness of 0.44 mil, heating in air reduced the thickness only to 0.36 mil and in argon only to 0.42 mil.

The coatings on all of those of the panels which had been tested by heating in argon retained the dark, gray color and the smooth, flat finish of the cured coatings. They could be scratched only by firm application of a sharp instrument. The cured coatings on those of the panels which had been tested by heating in air changed from dark gray to off-white. However, film integrity remained good. Although they could be scratched, no flaking occurred. The four panels, i.e., the two cured panels which had been subjected to the heat test in air and the two cured panels which had been subjected to the heat test in argon, were stored under ambient conditions for about 18 months. Inspection of the stored panels at the end of that time showed no change in the adherence, color, film thickness or hardness of the coatings.

In the above example, the polymeric organophosphate was prepared by reaction of phenyl diimidazol-1-ylphosphinate with resorcinol; however, a polymer prepared by reacting the resorcinol with phenyl phosphorodichloridate and consisting of the same polymer unit; i.e., the unit

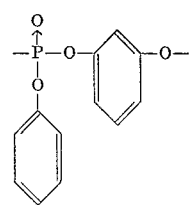

gives the same results when employed with titanium dioxide in the manner set forth above. Also, polymeric organophosphates consisting of units in which the phenyl group of the above depicted unit is replaced by another aromatic hydrocarbon group, e.g., the o-, m- or p-tolyl, the pentamethylphenyl, the naphthyl, the benzyl or the biphenylyl radical are likewise useful for the present purpose. Moreover, organophosphate polymers in which the phenylene group has been replaced by other arylene groups such as the naphthylene, the biphenylene, the methylenediphenylene or the xylylene radical are also useful to give the presently provided titanium dioxide-containing coatings.

Although the above example is limited to only stainless steel and aluminum as the substrate, the invention is applicable to the coating of metals generally, e.g., iron and the various alloys thereof, manganese, chromium, copper, beryllium, cobalt, titanium and heavy metals, generally. The presently provided coating process is likewise suitable for the provision of tough and adherent, thermally stable, protective coatings for siliceous materials, including the ceramics and glasses and for carbonaceous materials such as graphite.

What I claim is:
1. The process which comprises substantially uniformly applying to the surface of a substrate a fluid composition consisting essentially of a mixture of a normally solid organophosphorus polymer consisting essentially of the repeating unit

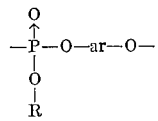

in which R and ar are aromatic hydrocarbyl radicals free of olefinic and acetylenic unsaturattion and contain from 6 to 15 carbon atoms, an inert, organic, liquid diluent for said polymer, and finely comminuted titanium dioxide in a quantity which is from 100% to 400% by weight of the polymer, evaporating off said diluent from said composition, and curing the composition remaining in an inert atmosphere at above 200° C. and below 550° C. to decrease the weight of the remaining composition by from 10 to 25% in order to obtain upon the substrate a strongly adherent in situ formed coating.

2. The process defined in claim 1, further limited in that the substrate is a heavy metal.

3. The process defined in claim 1, further limited in that the substrate is aluminum.

4. The process defined in claim 1, further limited in that the substrate is stainless steel.

5. The process defined in claim 1, further limited in that R is the phenyl radical.

6. The process defined in claim 1, further limited in that ar is the phenylene radical.

7. The process defined in claim 1, further limited in that R is the phenyl radical and ar is the phenylene radical.

8. The coated substrate produced by the process defined in claim 1.

9. The process of curing a coating deposited upon a heavy metal substrate and consisting essentially of titanium dioxide and a normally solid organophosphorus polymer consisting essentially of the repeating unit

wherein R and ar are aromatic hydrocarbyl radicals free of olefinic and acetylenic unsaturation and containing from 6 to 15 carbon atoms and wherein the weight ratio of titanium dioxide to the polymer is from 1:1 to 4:1, which comprises heating the substrate with the coating deposited thereon in an inert atmosphere at a temperature above 200° C. and below 550° C. until the weight of the coating has been reduced by from 10 to 25 percent.

10. The cured coating produced by the process defined in claim 1.

11. The process of curing a coating deposited upon a heavy metal substrate and consisting essentially of titanium dioxide and a normally solid organophosphorus polymer consisting essentially of the repeating unit

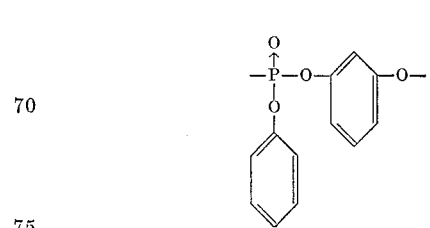

and wherein the weight ratio of titanium dioxide to the polymer is from 1.1:1.0 to 2.5:1.0, which comprises heating the substrate with the coating deposited thereon in an inert atmosphere to a temperature of 500° C. to obtain a weight decrease in the coating of from 10 to 25 percent.

12. The cured coating produced by the process defined in claim 11.

13. The process defined in claim 11, further limited in that the metal is aluminum.

14. The process defined in claim 11, further limited in that the metal is steel.

References Cited

UNITED STATES PATENTS

| | | | |
|---|---|---|---|
| 2,435,252 | 2/1948 | Fontoy | 260—64 |
| 2,596,939 | 5/1952 | Nielsen et al. | 106—15 X |
| 2,616,873 | 11/1952 | Cass | 260—61 |

RALPH S. KENDALL, *Primary Examiner.*

U.S. Cl. X.R.

117—137, 161; 260—37, 61